United States Patent
Kim

(10) Patent No.: US 9,732,819 B2
(45) Date of Patent: Aug. 15, 2017

(54) ELECTRONICALLY CONTROLLED INTERNAL DAMPER

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtack-si, Gyeonggi-do (KR)

( * ) Notice: Subject to any disclaimer, the term of this patent is extended or adjusted under 35 U.S.C. 154(b) by 0 days.

(21) Appl. No.: 15/009,772

(22) Filed: Jan. 28, 2016

(65) Prior Publication Data

US 2016/0223047 A1   Aug. 4, 2016

(30) Foreign Application Priority Data

Jan. 29, 2015   (KR) .......................... 10-2015-0014406

(51) Int. Cl.
*F16F 9/46*    (2006.01)
*F16F 9/516*   (2006.01)
(Continued)

(52) U.S. Cl.
CPC .............. *F16F 9/5165* (2013.01); *F16F 9/16* (2013.01); *F16F 9/3214* (2013.01); *F16F 9/348* (2013.01);
(Continued)

(58) Field of Classification Search
CPC .... F16F 9/46; F16F 9/461; F16F 9/464; F16F 9/465; F16F 9/512; F16F 9/5126; F16F 9/516; F16F 9/5165; F16F 9/3214; F16F 9/348; F16F 9/3482; F16F 9/3484

USPC ... 188/266, 266.1, 266.2, 266.5, 281, 282.1, 188/282.2, 282.3, 282.4, 282.5, 282.6, 188/282.8, 282.9

See application file for complete search history.

(56) References Cited

U.S. PATENT DOCUMENTS 4,953,671 A * 9/1990 Imaizumi ................ F16F 9/512
                                                    188/266.3
6,782,980 B2 * 8/2004 Nakadate .............. F16F 9/3214
                                                    188/313

(Continued)

FOREIGN PATENT DOCUMENTS

JP              07332425 A  * 12/1995

*Primary Examiner* — Thomas J Williams
(74) *Attorney, Agent, or Firm* — McDermott Will & Emery LLP

(57) ABSTRACT

An electronically controlled internal damper includes: a main passage formed by a working fluid flowing through a main piston; a pilot passage formed by a working fluid as much as a predetermined amount discharged from a first pilot chamber and a second pilot chamber so as to maintain internal pressures of the first pilot chamber and the second pilot chamber to a predetermined level when pressures of the first pilot chamber and the second pilot chamber are increased beyond the predetermined level; and a bypass passage formed by a working fluid passing through the compression retainer and the rebound retainer symmetrically disposed above and under the main piston and a plurality of holes formed transversely to a vertical length direction of a spool rod. Accordingly, the electronically controlled internal damper is capable of implementing damping performance in both a soft mode and a hard mode with a relatively simple structure and increasing sealing performance while reducing rigidity.

13 Claims, 4 Drawing Sheets

(51) Int. Cl.
   *F16F 9/16*     (2006.01)
   *F16F 9/32*     (2006.01)
   *F16F 9/348*    (2006.01)

(52) U.S. Cl.
   CPC ............ *F16F 9/3484* (2013.01); *F16F 9/464* (2013.01); *F16F 9/465* (2013.01)

(56) References Cited

U.S. PATENT DOCUMENTS

| | | | |
|---|---|---|---|
| 6,860,370 B2 * | 3/2005 | Nakadate | F16F 9/3485 188/282.5 |
| 7,997,394 B2 * | 8/2011 | Yamaguchi | F16F 9/465 188/266.2 |

* cited by examiner

[Fig. 1]

FIG. 2
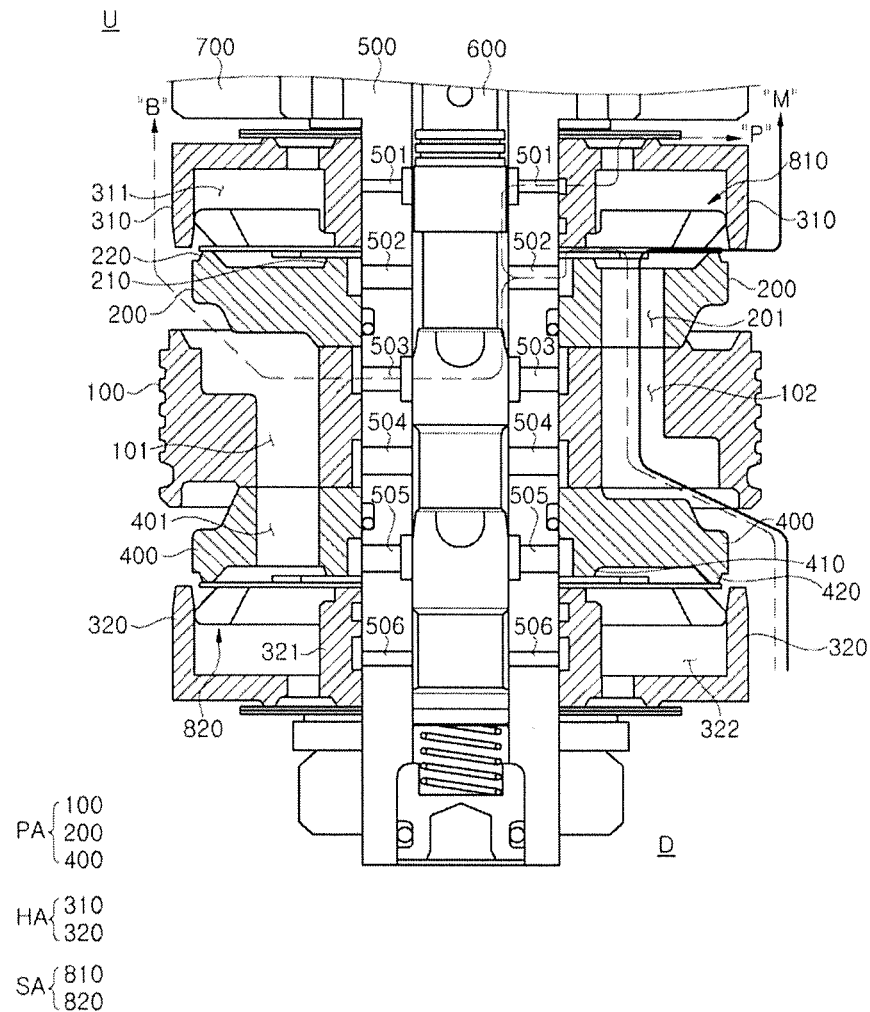
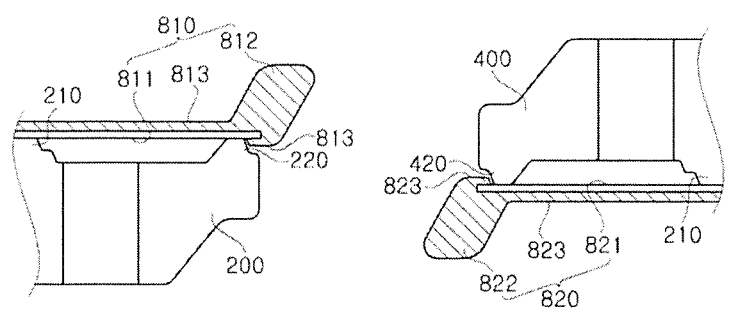
FIG. 3A
FIG. 3B

ELECTRONICALLY CONTROLLED INTERNAL DAMPER

CROSS-REFERENCE(S) TO RELATED APPLICATION

This application claims priority of Korean Patent Application No. 10-2015-0014406, filed on Jan. 29, 2015, in the Korean Intellectual Property Office, which is hereby incorporated by reference in its entirety.

BACKGROUND OF THE INVENTION

Field of the Invention

The present invention relates to an electronically controlled internal damper, and more particularly, to an electronically controlled internal damper that is capable of implementing damping performance in both a soft mode and a hard mode through a relatively simple structure and increasing sealing performance while reducing rigidity.

Description of the Related Art

Generally, in an electronically controlled external damper, since a passage of a rebound stroke is the same as a passage of a compression stroke, damping forces of the rebound stroke and the compression stroke is adjusted through one variable valve.

Consequently, the electronically controlled external damper cannot independently adjust the damping forces of the rebound stroke and the compression stroke in the valve, wherein a difference in the damping force occurs depending on the difference in a flow rate passing through the same valve.

In consideration of these points, it is possible to adjust the damping force of the compression stroke through a rigidity of a check valve on a compression side of a main piston, but its degree of freedom is considerably limited as compared with a conventional damper that adjusts a damping force by using a separate valve in each stroke.

Therefore, even though the electronically controlled damper is expensive as compared with the conventional damper, the degree of freedom of damping force adjustment decreases.

On the other hand, the electronically controlled internal damper can independently control the damping forces through the separate independent valves in the rebound stroke and the compression stroke as in the conventional damper. However, in order to increase the flow rate on the compression side of the variable valve and implement damping performance in a hard mode, the stacking number of disks for sealing increases and thus the rigidity increases.

If the rigidity on the compression side of the variable valve increases, a damping force of a soft mode increases and thus the degree of freedom of damping force adjustment decreases.

CITATION LIST

Patent Literature (Patent Literature 1) Korean Patent Registration No. 10-0947288

SUMMARY OF THE INVENTION

The present invention has been made in an effort to solve the above problems and is directed to provide an electronically controlled internal damper that is capable of implementing damping performance in both a soft mode and a hard mode through a relatively simple structure and increasing sealing performance while reducing rigidity, thereby increasing a degree of freedom of damping force adjustment and a variable range by reducing a damping force of a soft mode and maintaining a damping force of a hard mode.

According to an embodiment of the present invention, an electronically controlled internal damper includes: a main passage formed by a working fluid flowing through a main piston in which compression passages and rebound passages are alternately disposed; a pilot passage formed by a working fluid as much as a predetermined amount discharged from a first pilot chamber and a second pilot chamber so as to maintain internal pressures of the first pilot chamber and the second pilot chamber to a predetermined level when pressures of the first pilot chamber and the second pilot chamber are increased beyond a predetermined level, the first pilot chamber being formed by a compression retainer disposed above the main piston and a first housing disposed above the compression retainer, the second pilot chamber being formed by a rebound retainer disposed under the main piston and a second housing disposed under the rebound retainer; and a bypass passage formed by a working fluid passing through the compression retainer and the rebound retainer symmetrically disposed above and under the main piston and a plurality of holes formed along a vertical length direction of a spool rod, the bypass passage being formed by a working fluid passing through a cylinder upper chamber and a cylinder lower chamber via the first pilot chamber and the second pilot chamber, wherein the spool rod passes through central portions of the main piston, the compression retainer, the rebound retainer, the first housing, and the second housing.

The electronically controlled internal damper may further include: a first sealing member mounted on a top surface of the compression retainer and allowing a vertical reciprocation to some degree by a pressure of the working fluid while sealing a lower inner peripheral surface of the first housing such that the inner space of the first housing becomes the first pilot chamber; and a second sealing member mounted on a bottom surface of the rebound retainer and allowing a vertical reciprocation to some degree by a pressure of the working fluid while sealing an upper inner peripheral surface of the second housing such that the inner space of the second housing becomes the second pilot chamber.

BRIEF DESCRIPTION OF THE DRAWINGS

FIG. 2 is a cross-sectional conceptual diagram illustrating an overall structure of an electronically controlled internal damper according to an embodiment of the present invention, as well as a passage during a compression stroke.

FIGS. 3A, 3B, 4A, 4B, 5A, 5B, 6A, and 6B are cross-sectional conceptual diagrams illustrating application examples of a sealing assembly in an electronically controlled internal damper according to various embodiments of the present invention.

DETAILED DESCRIPTION OF EXEMPLARY EMBODIMENTS

Figure 1:
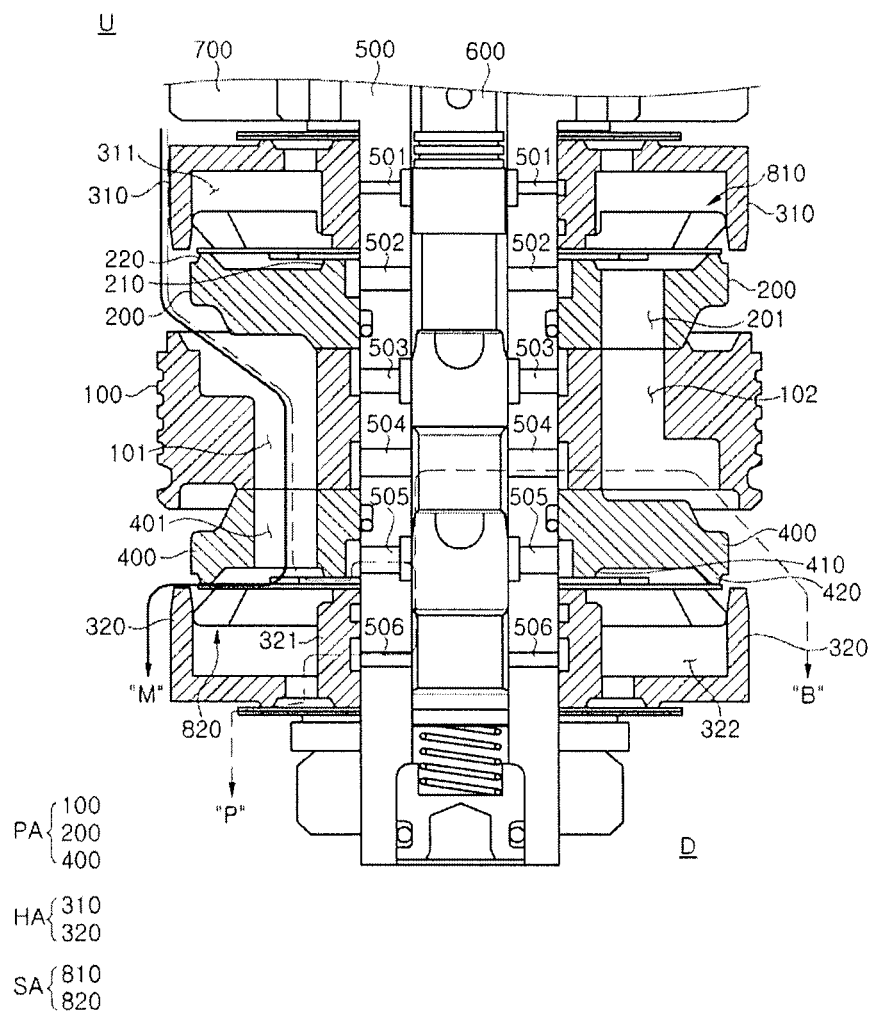
FIG. 1 is a cross-sectional conceptual diagram illustrating an overall structure of an electronically controlled internal damper according to an embodiment of the present invention, as well as a passage during a rebound stroke.

The advantages and features of the present invention and methods for achieving them will become more apparent from the following embodiments that are described in detail in conjunction with the accompanying drawings.

However, the present invention is not limited to the following embodiments, but may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted for simplicity and clarity.

Throughout the disclosure, like reference numerals refer to like elements. The terminology used herein is intended to just describe particular embodiments and is not intended to limit the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless defined otherwise, all terms including technical and scientific terms will be used herein so as to have the same meaning as commonly understood by one of ordinary skill in the art to which the present invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now, preferred embodiments of the present invention will be described with reference to the accompanying drawings.

FIG. 1 is a cross-sectional conceptual diagram illustrating an overall structure of an electronically controlled internal damper according to an embodiment of the present invention, as well as a passage during a rebound stroke, and FIG. 2 is a cross-sectional conceptual diagram illustrating an overall structure of an electronically controlled internal damper according to an embodiment of the present invention, as well as a passage during a compression stroke.

As illustrated, the electronically controlled internal damper according to the present invention includes a main passage M, a pilot passage P, and a bypass passage B.

The main passage M is formed by a working fluid flowing through a main piston 100 in which compression passages 102 and rebound passages 101 are alternately disposed.

When the internal pressures of a first pilot chamber 311 and a second pilot chamber 322 are increased beyond a predetermined level, the pilot passage P is formed by a working fluid as much as a predetermined amount discharged from the first pilot chamber 311 and the second pilot chamber 322 so as to maintain the internal pressures of the first pilot chamber 311 and the second pilot chamber 322 to a predetermined level.

The first pilot chamber 311 is formed by a compression retainer 200 disposed above the main piston 100 and a first housing 310 disposed above the compression retainer 200.

In this case, the second pilot chamber 322 is formed by a rebound retainer 400 disposed under the main piston 100 and a second housing 320 disposed under the rebound retainer 400.

The bypass passage B is formed by a working fluid passing through the compression retainer 200 and the rebound retainer 400 symmetrically disposed above and under the main piston 100 and a plurality of holes 501 to 506 formed transversely to the vertical length direction of a spool rod 500.

That is, the bypass passage B is formed by a working fluid flowing between a cylinder upper chamber U and a cylinder lower chamber D while passing past the first pilot chamber 311 and the second pilot chamber 322.

The spool rod 500 penetrates in the central portions of the main piston 100, the compression retainer 200, the rebound retainer 400, the first housing 310, and the second housing 320.

In addition to the above-described embodiment, the following various embodiments are also applicable in the present invention.

Specifically, referring to FIG. 1, during the rebound stroke, the main passage M is formed by a working fluid that flows from an upper portion of the rebound passage 101 of the main piston 100 to a communication hole 401 of the rebound retainer 400 disposed on a bottom surface of the main piston 100 and is discharged to the outside of the second housing 320 through an upper space of the second housing 320 disposed under the rebound retainer 400.

Referring to FIG. 2, during the compression stroke, the main passage M is formed by a working fluid that flows from a lower portion of the compression passage 102 of the main piston 100 to a communication hole 201 of the compression retainer 200 disposed on a top surface of the main piston 100 and is discharged to the outside of the first housing 310 through a lower space of the first housing 310 disposed above the compression retainer 200.

Referring to FIG. 1 again, during the rebound stroke, the bypass passage B is formed by a working fluid that flows from an upper portion of the rebound passage 101 of the main piston 100 through the communication hole 401 of the rebound retainer 400 and passes through the spool rod 500 across a reciprocating direction of a driven spool 600 and is then discharged to the outside of the rebound retainer 400 through the compression passage 102 of the main piston 100 and past a top surface of the rebound retainer 400.

Referring to FIG. 2 again, during the compression stroke, the bypass passage B is formed by a working fluid that flows from a lower portion of the compression passage 102 of the main piston 100 through the communication hole 201 of the compression retainer 200 and passes through the spool rod 500 across the reciprocating direction of the driven spool 600 and is then discharged to the outside of the compression retainer 200 through the rebound passage 101 of the main piston 100 and past a top surface of the compression retainer 200.

Referring to FIG. 1 again, during the rebound stroke, the pilot passage P is formed by a working fluid that flows from an upper portion of the compression passage 101 of the main piston 100 through the communication hole 401 of the rebound retainer 400 and passes through the spool rod 500 across the reciprocating direction of the driven spool 600 and is then discharged to the bottom outside of the second housing 320 through the second pilot chamber 322 that is the inner space of the second housing 320.

Referring to FIG. 2 again, during the compression stroke, the pilot passage P is formed by a working fluid that flows from a lower portion of the compression passage 102 of the main piston 100 through the communication hole 201 of the compression retainer 200 and passes through the spool rod 500 across the reciprocating direction of the driven spool 600 and is then discharged to the top outside of the first housing 310 through the first pilot chamber 311 that is the inner space of the first housing 310.

The respective elements of the electronically controlled internal damper configured to form the main passage M, the pilot passage P, and the bypass passage B will be described below.

The spool rod 500 is mounted at an end of the piston rod 700, and the driven spool 600 is installed therein being reciprocally movable along a length direction.

Among the elements of the electronically controlled internal damper configured to form the main passage M, the pilot passage P, and the bypass passage B, a piston assembly PA the central portion of which is penetrated by the spool rod 500 mounted at the piston rod 700 is interlocked with the reciprocation of the piston rod 700 to allow the working fluid to flow between the cylinder upper chamber U and the cylinder lower chamber D. The piston assembly PA includes the main piston 100, the compression retainer 200, and the rebound retainer 400.

As described above, the rebound passages 101 and the compression passages 102 are alternately disposed in the main piston 100.

The compression retainer 200 is disposed on the top surface of the main piston 100 and includes the communication holes 201 respectively communicating with the plurality of compression passages 102.

The rebound retainer 400 is disposed on the bottom surface of the main piston 100 and includes the communication holes 401 respectively communicating with the plurality of rebound passages 101.

The spool rod 500 passes through the central portions of the main piston 100, the compression retainer 200, and the rebound retainer 400.

A housing assembly HA includes the first housing 310 and the second housing 320. The first housing 310 is disposed above the compression retainer 200. The bottom surface of the first housing 310 is opened. The inner space of the first housing 310 communicates with its top outside. The second housing 320 is disposed under the rebound retainer 400. The top surface of the second housing 320 is opened. The inner space of the second housing 320 communicates with its bottom outside.

A sealing assembly SA includes a first sealing member 810 and a second sealing member 820 that block the first and second pilot chambers 311 and 322 of the first and second housings 310 and 320 respectively so as to form the pilot passages P.

The first sealing member 810 is mounted on the top surface of the compression retainer 200 and allows a vertical reciprocation to some degree by a pressure of the working fluid while abutting sealingly a lower inner peripheral surface of the first housing 310 such that the inner space of the first housing 310 becomes the first pilot chamber 311.

The second sealing member 820 is mounted on the bottom surface of the rebound retainer 400 and allows a vertical reciprocation to some degree by a pressure of the working fluid while abutting sealingly an upper inner peripheral surface of the second housing 320 such that the inner space of the second housing 320 becomes the second pilot chamber 322.

Hereinafter, various embodiments of the first and second sealing members 810 and 820 will be described with reference to FIGS. 3A, 3B, 4A, 4B, 5A, 5B, 6A, and 6B. Reference numerals that are not represented in FIGS. 3A, 3B, 4A, 4B, 5A, 5B, 6A, and 6B will be referred to by FIGS. 1 and 2.

Referring to FIG. 3A, the first sealing member 810 may include a first sealing disk 811 and a first seal lip 812.

The first sealing disk 811 is mounted on a first compression disk seat 210 protruding in a ring shape at a top central portion of the compression retainer 200 through which the spool rod 500 passes, and a lower outer edge thereof contacts a second compression disk seat 220 protruding in a ring shape along a top outer edge of the compression retainer 200.

The first seal lip 812 is an elastic member that is connected to the first sealing disk 811 and contacts the lower inner peripheral surface of the first housing 310.

In addition, as illustrated in FIG. 3A, the first sealing member 810 may further include a first over-molding portion 813 that covers the entire top surface of the first sealing disk 811 and the bottom edge of the first sealing disk 811, is connected to the first seal lip 812, and is integrally formed with the first seal lip 812.

The second compression disk seat 220 may contact the bottom surface of the first sealing disk 811 in which the first over-molding portion 813 is absent.

Referring to FIG. 3B, the second sealing member 820 may include a second sealing disk 821 and a second seal lip 822.

The second sealing disk 821 is mounted on a first rebound disk seat 410 protruding in a ring shape at a bottom central portion of the rebound retainer 400 through which the spool rod 500 passes, and an upper outer edge thereof contacts a second rebound disk seat 420 protruding in a ring shape along a bottom outer edge of the rebound retainer 400.

The second seal lip 822 is an elastic member that is connected to the second sealing disk 821 and contacts the upper inner peripheral surface of the second housing 320.

In addition, as illustrated in FIG. 3B, the second sealing member 820 may further include a second over-molding portion 823 that covers the entire bottom surface of the second sealing disk 821 and the top edge of the second sealing disk 821, is connected to the second seal lip 822, and is integrally formed with the second seal lip 822.

The second rebound disk seat 420 may contact the top surface of the second sealing disk 821 in which the second over-molding portion 823 is absent.

Figure 4A:
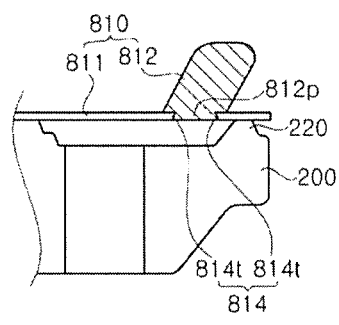

Referring to FIG. 4A, the first sealing member 810 may have a structure in which a first coupling protrusion 812p is connected to a first coupling slot 814 where a first tapered surface 814t is formed.

The first coupling slot 814 may be provided in plurality. The plurality of first coupling slots 814 may be spaced apart from one other, have a predetermined length in the edge inside of the first sealing disk 811, and be through-holes having shape of an arc.

The first tapered surface 814t is formed to be gradually widened toward the bottom surface of the first sealing disk 811 along the inner surface of each of the first coupling slots 814.

The first coupling protrusion 812p may be provided in plurality. The plurality of first coupling protrusions 812p protrude along the bottom surface of the first seal lip 812 in a shape corresponding to the first tapered surface 814t and the plurality of first coupling slots 814 and are respectively fixed to the plurality of first coupling slots 814.

Therefore, when the first coupling protrusion 812p is fitted into the first coupling slot 814, the first coupling protrusion 812p can maintain a tightly coupled state so that the first coupling protrusion 812p is hardly released from the first coupling slot 814.

Figure 4B:
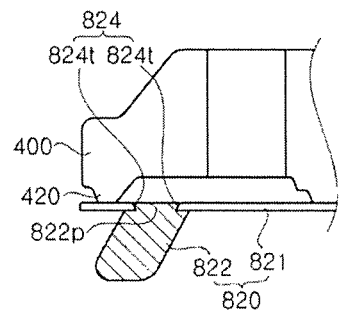

Referring to FIG. 4B, the second sealing member 820 may have a structure in which a second coupling protrusion 822p is connected to a second coupling slot 824 where a second tapered surface 824t is formed.

The second coupling slot 824 may be provided in plurality. The plurality of second coupling slots 824 may be spaced apart from one other, have a predetermined length in the edge inside of the second sealing disk 821, and be throughholes having shape of an arc.

The second tapered surface 824t is formed to be gradually widened toward the top surface of the second sealing disk 821 along the inner surface of each of the second coupling slots 824.

The second coupling protrusion 822p may be provided in plurality. The plurality of second coupling protrusions 822p protrude along the top surface of the second seal lip 822 in a shape corresponding to the second tapered surface 824t and the plurality of second coupling slots 824 and are respectively fixed to the plurality of second coupling slots 824.

Therefore, when the second coupling protrusion 822p is fitted into the second coupling slot 824, the second coupling protrusion 822p can maintain a tightly coupled state so that the second coupling protrusion 822p is hardly released from the second coupling slot 824.

Figure 5A:
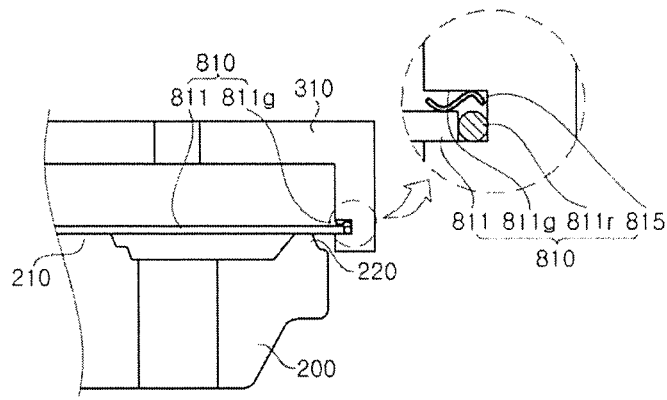

Referring to FIG. 5A, the first sealing member 810 may include a first sealing disk 811 and a first sealing groove 811g.

The first sealing disk 811 is mounted on a first compression disk seat 210 protruding in a ring shape at the top central portion of the compression retainer 200 through which the spool rod 500 passes, and a lower outer edge thereof is mounted on a second compression disk seat 220 protruding in a ring shape along a top outer edge of the compression retainer 200.

The first sealing groove 811g is recessed in a ring shape along a lower inner peripheral surface of the first housing 310. The edge of the first sealing disk 811 is inserted therein. The first sealing groove 811g forms a space that allows the edge of the first sealing disk 811 to be movable in a vertical direction to some degree.

Referring to FIG. 5A, the first sealing member 810 may further include a first ring washer 815 that is disposed in the upper portion of the first sealing groove 811g and is subjected to an elastic deformation while generating an elastic repulsive force to press down the edge of the first sealing disk 811 intended to move upward by the working fluid.

In this case, as illustrated, the cross-section of the first ring washer 815 has a wave shape in which an upwardly convex arc and a downwardly convex arc are connected to each other, and can generate a resilient force and can be returned to its initial shape after being compressed.

Additionally, in order to maintain a sealing property, the first sealing member 810 may further include a first O-ring 811r disposed between the inner surface of the first sealing groove 811g and the edge of the first sealing disk 811.

Figure 5B:
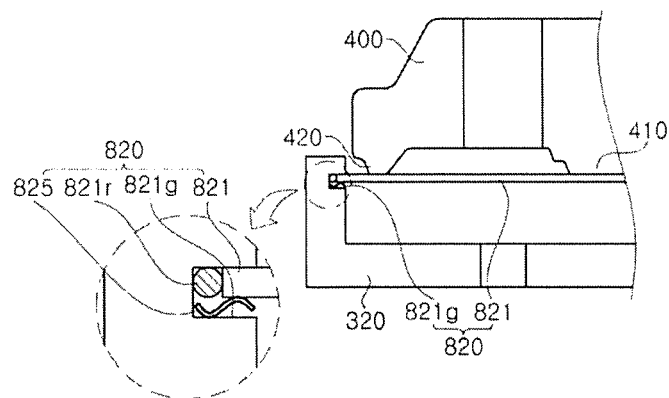

Referring to FIG. 5B, the second sealing member 820 may include a second sealing disk 821 and a second sealing groove 821g.

The second sealing disk 821 contacts a first rebound disk seat 410 protruding in a ring shape at the bottom central portion of the rebound retainer 400 through which the spool rod 500 passes, and an upper outer edge thereof contacts a second rebound disk seat 420 protruding in a ring shape along a bottom outer edge of the rebound retainer 400.

The second sealing groove 821g is recessed in a ring shape along an upper inner peripheral surface of the second housing 320. The edge of the second sealing disk 821 is inserted therein. The second sealing groove 821g forms a space that allows the edge of the second sealing disk 821 to be movable in a vertical direction to some degree.

Referring to FIG. 5B, the second sealing member 820 may further include a second ring washer 825 that is disposed in the lower portion of the second sealing groove 821g and is subjected to an elastic deformation while generating a resilient force to press up the edge of the second sealing disk 821 intended to move downward by the working fluid.

In this case, as illustrated, the cross-section of the second ring washer 825 has a wave shape in which an upwardly convex arc and a downwardly convex arc are connected to each other, and can generate a resilient force and can be returned to its initial shape after being compressed.

Additionally, in order to maintain sealing property, the second sealing member 820 may further include a second O-ring 821r disposed between the inner surface of the second sealing groove 821g and the edge of the second sealing disk 821.

Figure 6A:
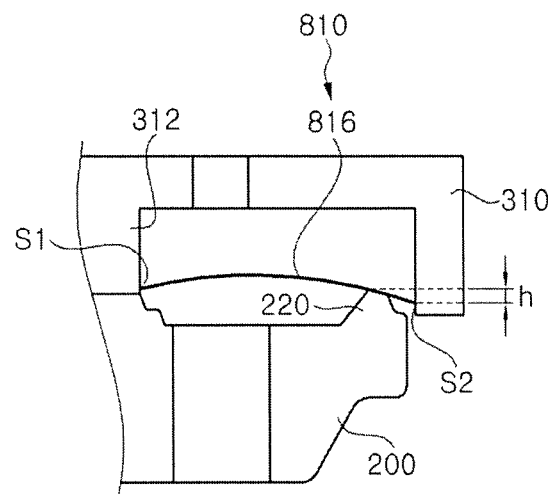

Referring to FIG. 6A, the first sealing member 810 may include a first sealing diaphragm 816.

The first sealing diaphragm 816 includes a first edge S1 and a second edge S2. The first edge S1 is supported at an outer peripheral surface of a first center support portion 312 extending from the inner top center of the first housing 310, so as to support the outer peripheral surface of the spool rod 500 passing through the central portion of the first housing 310. The second edge S2 is supported at the lower inner peripheral surface of the first housing 310.

The first sealing diaphragm 816 is mounted on the second compression disk seat 220 protruding in a ring shape along the top outer edge of the compression retainer 200 and is subjected to a shape deformation.

In this case, the first edge S1 and the second edge S2 are disposed at the same height, and the upper end of the second compression disk seat 220 is disposed at higher level than that of the first edge S1 and the second edge S2. Thus, the shape deformation is the first sealing diaphragm 816 can be allowed.

Figure 6B:
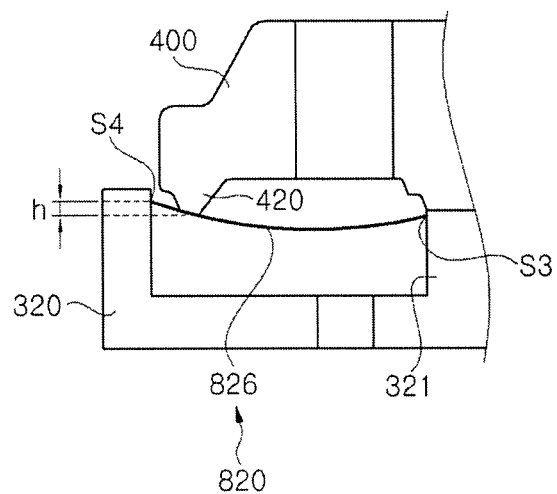

Referring to FIG. 6B, the second sealing member 820 may include a second sealing diaphragm 826.

The second sealing diaphragm 826 includes a third edge S3 and a fourth edge S4. The third edge S3 is supported at an outer peripheral surface of a second center support portion 321 extending from the inner bottom center of the second housing 320, so as to support the outer peripheral surface of the spool rod 500 passing through the central portion of the second housing 320. The fourth edge S4 is supported at the upper inner peripheral surface of the second housing 320.

The second sealing diaphragm 826 is mounted on the second rebound disk seat 420 protruding in a ring shape along the bottom outer edge of the rebound retainer 400 and is subjected to a shape deformation.

In this case, the third edge S3 and the fourth edge S4 are disposed at the same height, and the lower end of the second rebound disk seat 420 is disposed at a lower level than that of the third edge S3 and the fourth edge S4. Thus, the shape deformation can be allowed.

A basic technical spirit of the present invention is to provide the electronically controlled internal damper that is capable of implementing damping performance in both the soft mode and the hard mode through a relatively simple structure and increasing sealing performance while reducing rigidity.

It is apparent to those skilled in the art that various modifications and applications can also be made without departing from the basic technical spirit of the present invention.

What is claimed is:

1. An electronically controlled internal damper comprising:
    a main passage formed by a working fluid flowing through a main piston in which compression passages and rebound passages are alternately disposed;
    a pilot passage formed by the working fluid as much as a predetermined amount discharged from a first pilot chamber and a second pilot chamber so as to maintain internal pressures of the first pilot chamber and the second pilot chamber to a predetermined level when pressures of the first pilot chamber and the second pilot chamber are increased beyond the predetermined level, the first pilot chamber being formed by a compression retainer disposed above the main piston and a first housing disposed above the compression retainer, and the second pilot chamber being formed by a rebound retainer disposed under the main piston and a second housing disposed under the rebound retainer; and
    a bypass passage formed by the working fluid passing through the compression retainer and the rebound retainer symmetrically disposed above and under the main piston and a plurality of holes formed transversely to a vertical length direction of a spool rod, the bypass passage being formed by the working fluid flowing between a cylinder upper chamber and a cylinder lower chamber bypassing the first pilot chamber and the second pilot chamber,
    wherein the spool rod penetrates in central portions of the main piston, the compression retainer, the rebound retainer, the first housing, and the second housing.

2. The electronically controlled internal damper according to claim 1, wherein, during a rebound stroke, the main passage is formed by the working fluid that flows from an upper portion of the rebound passage of the main piston to a communication hole of the rebound retainer disposed on a bottom surface of the main piston and is discharged to the outside of the second housing through an upper space of the second housing disposed under the rebound retainer.

3. The electronically controlled internal damper according to claim 1, wherein, during a compression stroke, the main passage is formed by the working fluid that flows from a lower portion of the compression passage of the main piston to a communication hole of the compression retainer disposed on a top surface of the main piston and is discharged to the outside of the first housing through a lower space of the first housing disposed above the compression retainer.

4. The electronically controlled internal damper according to claim 1, wherein, during a rebound stroke, the bypass passage is formed by the working fluid that flows from an upper portion of the rebound passage of the main piston through a communication hole of the rebound retainer and passes through the spool rod across a reciprocating direction of a driven spool and is then discharged to the outside of the rebound retainer through the compression passage of the main piston and bypass a top surface of the rebound retainer.

5. The electronically controlled internal damper according to claim 1, wherein, during a compression stroke, the bypass passage is formed by the working fluid that flows from a lower portion of the compression passage of the main piston through a communication hole of the compression retainer and passes through the spool rod across the reciprocating direction of the driven spool and is then discharged to the outside of the compression retainer through the rebound passage of the main piston and bypass a top surface of the compression retainer.

6. The electronically controlled internal damper according to claim 1, wherein, during a rebound stroke, the pilot passage is formed by the working fluid that flows from an upper portion of the compression passage of the main piston through a communication hole of the rebound retainer and passes through the spool rod across the reciprocating direction of the driven spool and is then discharged to the bottom outside of the second housing through the second pilot chamber that is the inner space of the second housing.

7. The electronically controlled internal damper according to claim 1, wherein, during a compression stroke, the pilot passage is formed by the working fluid that flows from a lower portion of the compression passage of the main piston through a communication hole of the compression retainer and passes through the spool rod across the reciprocating direction of the driven spool and is then discharged to the top outside of the first housing through the first pilot chamber that is the inner space of the first housing.

8. The electronically controlled internal damper according to claim 1, further comprising:
    a piston assembly including the main piston in which the compression passages and the rebound passages are alternately disposed, the compression retainer disposed on a top surface of the main piston and including a plurality of communication holes respectively communicating with the compression passages, and the rebound retainer disposed on a bottom surface of the main piston and including communication holes respectively communicating with the rebound passages, wherein the spool rod penetrates in central portions of the main piston, the compression retainer, and the rebound retainer; and
    a housing assembly including a first housing and a second housing, wherein the first housing is disposed above the compression retainer, a bottom surface of the first housing is opened, an inner space of the first housing communicates with its top outside, the second housing is disposed under the rebound retainer, a top surface of the second housing is opened, and an inner space of the second housing communicates with its bottom outside.

9. The electronically controlled internal damper according to claim 8, further comprising:
    a first sealing member mounted on a top surface of the compression retainer and allowing a vertical reciprocation to some degree by pressure of the working fluid while abutting sealingly a lower inner peripheral surface of the first housing such that the inner space of the first housing becomes the first pilot chamber; and
    a second sealing member mounted on a bottom surface of the rebound retainer and allowing a vertical reciprocation to some degree by pressure of the working fluid while abutting sealingly an upper inner peripheral surface of the second housing such that the inner space of the second housing becomes the second pilot chamber.

10. The electronically controlled internal damper according to claim 9, wherein the first sealing member includes:
    a first compression disk disposed between the compression retainer and the first housing; and
    a first seal lip that is an elastic member connected to the first compression disk and contacting a lower inner peripheral surface of the first housing.

11. The electronically controlled internal damper according to claim 10, wherein a connection between the first compression disk and the first seal lip is performed by inserting a first coupling protrusion formed in the first seal lip into a first coupling slot formed in the first compression disk and having a first tapered surface, and the first tapered surface is gradually widened toward a bottom surface of the first sealing disk.

12. The electronically controlled internal damper according to claim 9, wherein the second sealing member includes:
a second compression disk disposed between the rebound retainer and the second housing; and
a second seal lip that is an elastic member connected to the second compression disk and contacting an upper inner peripheral surface of the second housing.

13. The electronically controlled internal damper according to claim 12, wherein a connection between the second compression disk and the second seal lip is performed by inserting a second coupling protrusion formed in the second seal lip into a second coupling slot formed in the second compression disk and having a second tapered surface, and the second tapered surface is gradually widened toward a top surface of the second sealing disk.

* * * * *